United States Patent [19]

Broadway

[11] 4,341,233
[45] Jul. 27, 1982

[54] FIRE SAFE SEAT FOR A ROTARY VALVE

[75] Inventor: William W. Broadway, Houston, Tex.

[73] Assignee: FMC Corporation, Chicago, Ill.

[21] Appl. No.: 163,657

[22] Filed: Jun. 27, 1980

[51] Int. Cl.³ .............................................. F16K 13/04
[52] U.S. Cl. ....................................... 137/72; 137/74; 251/306; 251/368
[58] Field of Search ........................... 137/72, 74, 375; 251/306, 307, 368

[56] References Cited

U.S. PATENT DOCUMENTS

| | | | |
|---|---|---|---|
| 3,177,887 | 4/1965 | Priese | 137/74 |
| 4,004,776 | 1/1977 | Stender | 251/368 X |
| 4,113,268 | 9/1978 | Simmons | 137/72 X |
| 4,118,009 | 10/1978 | Chmura | 251/368 X |
| 4,162,782 | 7/1979 | Wilkins | 251/306 X |
| 4,244,387 | 1/1981 | Snape | 137/72 |

*Primary Examiner*—Harold W. Weakley
*Attorney, Agent, or Firm*—L. Guernsey; W. William Ritt, Jr.

[57] ABSTRACT

A fire-safe rotary valve seat assembly for use in pressurized fluid systems subject to fire risk, the seat assembly having both a metal seat ring and an annular resilient non-metallic seal member to provide essentially zero fluid leakage at normal operating temperatures, and the metal seat ring to provide an extremely low rate of fluid leakage in the event high temperature should destroy the flexible seal member. The metal seat ring includes an annular groove around its radially inward face with a pair of flexible lips forming the walls of the groove, and the annular resilient seal member is mounted in the groove between the lips. The lips and the annular resilient seal member both engage a sealing surface on the circumference of a metal valve disc to provide a primary seal for the valve. If the annular resilient seal member is destroyed, the metal lips continue to provide an undamaged secondary seal.

7 Claims, 6 Drawing Figures

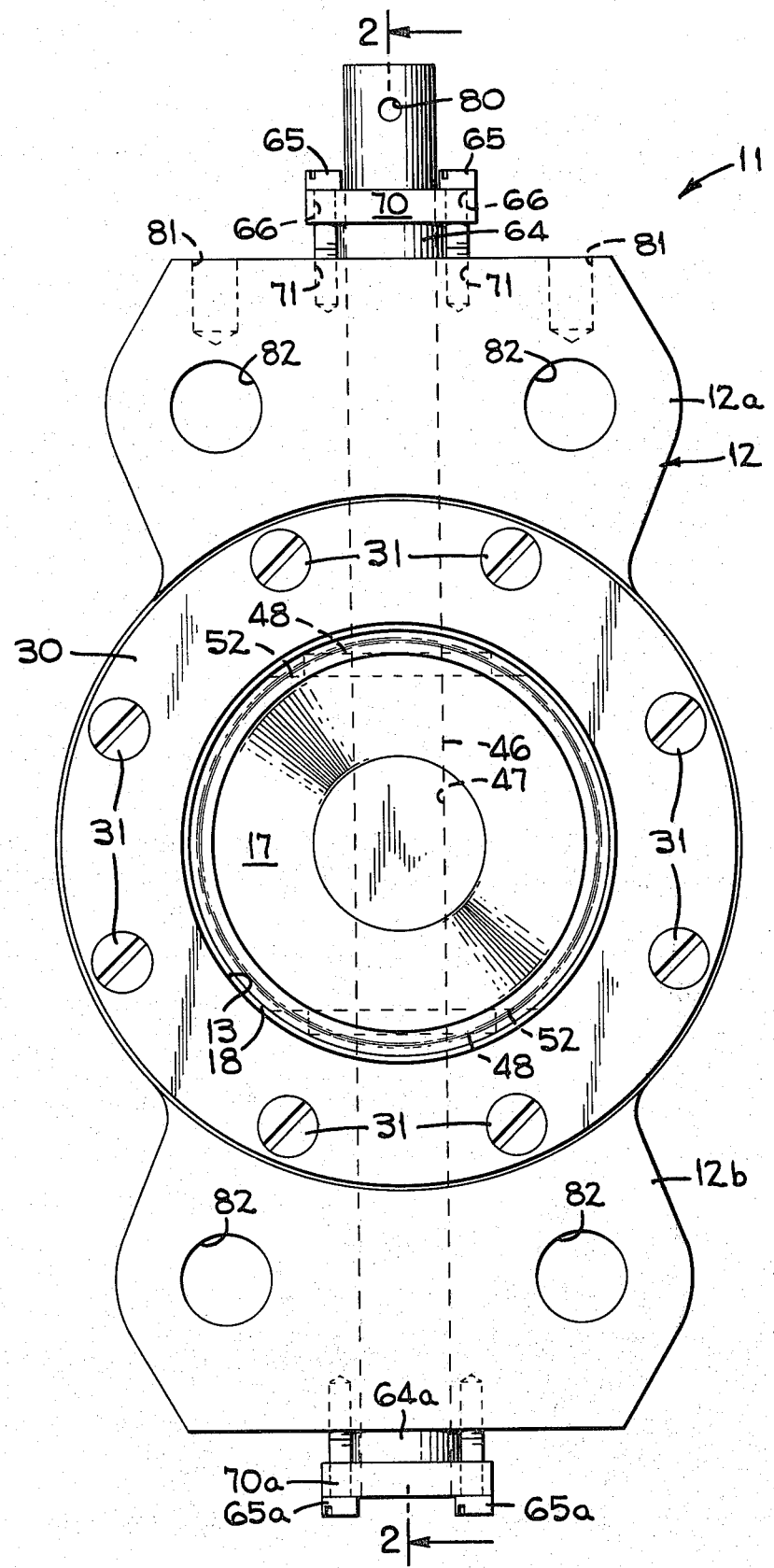

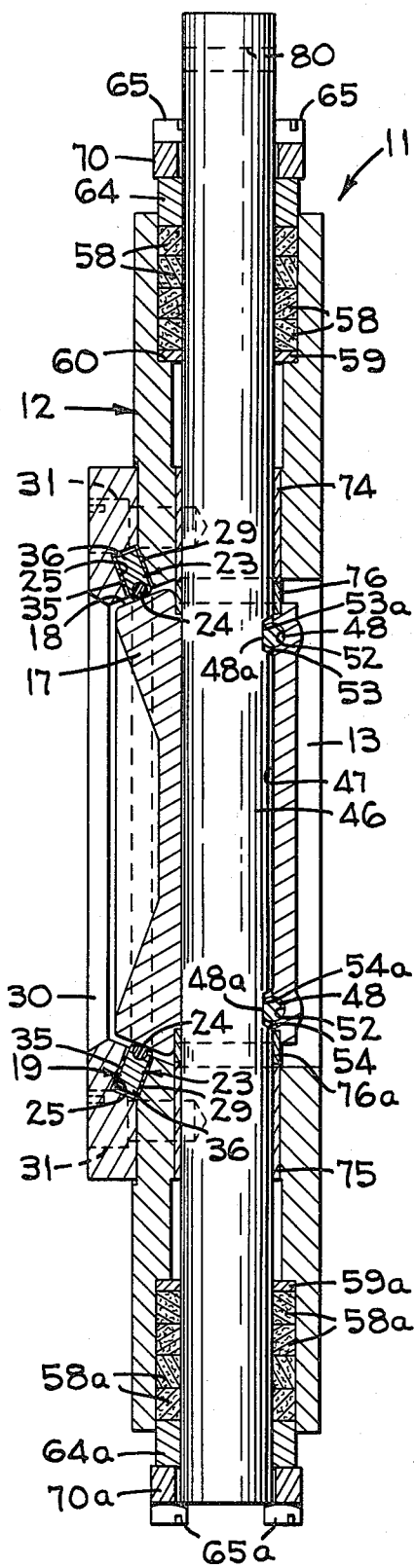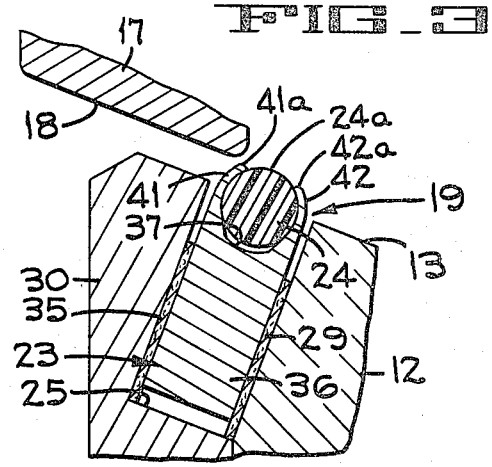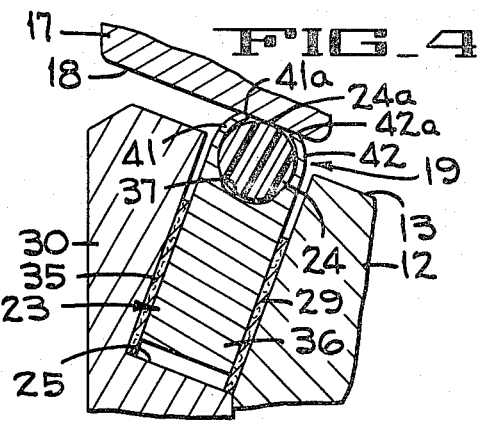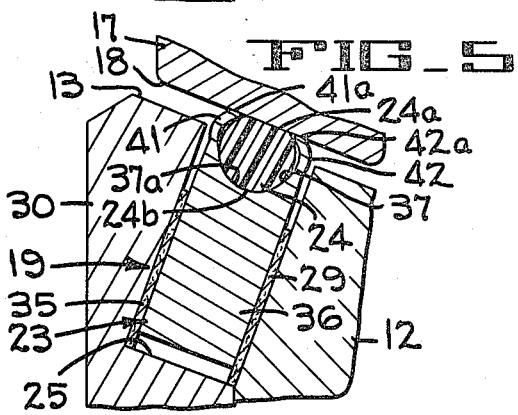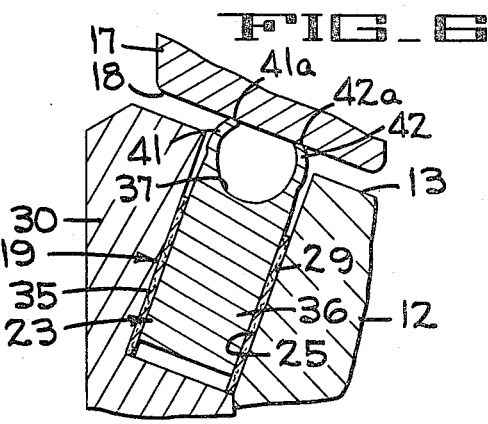

FIRE SAFE SEAT FOR A ROTARY VALVE

BACKGROUND OF THE INVENTION

1. Field of the Invention

This invention relates to fluid control valves, and more particularly, to an annular valve seat for use in both normal and relatively high temperature environments.

2. Description of the Prior Art

Butterfly and other types of fluid control valves with annular resilient seals are well known and commonly used for controlling the flow of various fluids at ambient or moderate temperatures and modest pressures in a wide variety of industries. Such control valves commonly have a generally annular body defining a fluid flow passage having a valve seat around the flow passage and a metallic flow control disc movably supported in the flow passage for controlling the flow of fluids through the valve. The valve is closed by pressing the disc against the valve seat to prevent the flow of fluid through the valve. Valves used at moderate temperatures and modest pressures commonly use annular resilient seals in the valve seat while metal seals are used at higher temperatures and higher pressures. Such metallic seals usually permit more leakage of fluid than do the resilient seals if used at lower temperatures. For this reason when the normal operating temperature is relatively low resilient seals are commonly used. However, in the petroleum industry there is sometimes the danger of a fire either inside the piping system itself or outside the piping system in the vicinity of the valve. When fire causes the valve temperature to rise to higher levels, the resilient seal of the valve can deteriorate or be destroyed so that it will no longer be effective as a seal.

Some of the prior art valves use a resilient seal when the valve is operating at a lower temperature and have a backup metal seal which moves into operating contact with a valve disc when the resilient seal is damaged. Such a backup valve seat may operate satisfactorily when the resilient seal is completely destroyed, but may have excessive fluid leakage when a portion of the resilient seal remains in the fluid flow passage.

What is desired is a fluid-control valve having both a resilient valve seal and a metal seat that maintain fluid-tight contact with the flow control disc when moderate temperatures are present in the valve, and wherein the metal seat continues to maintain said fluid-tight contact if the resilient seal is partially or completely destroyed.

SUMMARY OF THE INVENTION

The present invention comprises a butterfly or other type of rotary valve with a fire-safe seat assembly for use in a generally annular valve body defining a fluid flow passage. The seat assembly includes a metal seat ring having an annular groove around its radially inward face with a pair of flexible lips forming the walls of the groove, and an annular resilient, non-metallic seal member mounted in the annular groove between the flexible lips. Means are provided for securing the metal seat ring to the valve body adjacent the fluid flow passage, such means causing the flexible lips and a portion of the resilient seal member to press against a flow control element when the flow control element closes the fluid flow passage while operating under moderate temperatures. If higher than normal temperatures should partially or completely destroy the resilient seal member the flexible lips of the metal seat ring continue to press against the flow control element and provide an effective seal. Thus, the flexible lips are pressed against the flow control element irrespective of the presence or absence of the resilient seal member in the groove of the metal seat ring.

BRIEF DESCRIPTION OF THE DRAWINGS

FIG. 1 is a front elevation of a butterfly valve employing the features of the present invention.

FIG. 2 is a partial end elevation of the valve taken along the line 2—2 of FIG. 1 showing the valve in the fully closed position.

FIG. 3 is an enlarged fragmentary section of the disc, the body, the retaining ring, and the fire-safe seat assembly of the valve of FIGS. 1 and 2 illustrating the relationship of the elements just prior to the disc engaging the metal seat ring.

FIG. 4 is a view like FIG. 3 illustrating the relationship of the elements of FIG. 3 with the disc partially engaging the metal seat ring.

FIG. 5 is like FIG. 3 showing the disc fully engaged with the resilient seal member and the metal seat ring.

FIG. 6 is a view like FIG. 3 illustrating the relationship of the elements with the flexible seal member either partially or completely destroyed and with the disc fully engaging the metal seat ring.

DESCRIPTION OF THE PREFERRED EMBODIMENT

As illustrated in FIGS. 1 and 2, a butterfly valve 11, incorporating features of the present invention with a bi-directional seat assembly for controlling the fluid flow in either direction, includes a generally annular body 12 defining a fluid flow passage 13, the illustrated body being adapted for insertion between opposed standard pipe flanges (not shown). Rotatably supported in the flow chamber 13 is a flow control disc 17 with a circumferentially sealing surface 18, the surface 18 having a hard facing surface to prevent scratches and abrasions formed as the disc is moved against a valve seat. As best seen in FIG. 2, the disc sealing surface 18 is adapted to cooperate with an annular bi-directional valve seat assembly 19 consisting of a metallic seat ring 23 which carries an annular resilient non-metallic seal member 24. The seat assembly 19 (FIGS. 2, 3–6) resides in an annular seat chamber 25 formed by a counterbore in a retainer ring 30, the retainer ring being releasably secured to the body 12 by capscrews 31 or other suitable means to facilitate quick and easy installation and removal of the seat assembly 19 without necessitating removal of the disc 17 or otherwise disassembling the valve. The capscrews 31 apply a sufficient axial load on the retainer ring 30 to cause an annular inner seat gasket 29 to effect a fluid seal between the seat ring 23 and the valve body 12, and to cause an annular outer seat gasket 35 to effect a fluid-tight seal between the seat ring 23 and the retainer ring 30. When the seat assembly 19 is being installed, the valve should be in its illustrated fully closed condition since the seat assembly is free-floating and thus will center itself diametrically against the disc 17 and thus establish a complete, unbroken sealing interface with the disc surface 18.

The annular metallic seat ring 23 (FIGS. 3–6) is formed of an annular body portion 36 having an annular groove 37 around the radially inward face, and a pair of curved flexible lips 41, 42 forming the walls of the groove 37. The resilient seal member 24, mounted in the groove 37, is formed in the shape of a donut or O-ring and is made of a resilient material such as tetrafluoroethylene (TFE) plastic. The valve seat is assembled by placing the resilient seal member 24 into the groove 37 between the two flexible lips 41, 42 of the annular metallic seat ring 23, and the flexible lips are then swaged over the resilient O-ring, forming a partial metallic encapsulation of the O-ring. After the encapsulation, only a narrow sealing portion of the resilient seal member is left exposed between the two metallic lips 41, 42 of the seat ring.

The metallic seat ring 23 may be made from a work hardenable material such as type 302 stainless steel so that each of the lips is capable of a spring action after it has been swaged into place, the swaging causing the lips to work harden. The spring action is desirable because both the narrow inner sealing portion 24a of the resilient seal member 24, and the open ends 41a, 42a of the seat ring 23, have an inner diameter less than the diameter of the sealing surface 18 of the flow control disc 17, and thus each provides an interference fit with the disc 17.

When the valve disc 18 is moved from the open position (FIG. 3) into contact with the valve seat assembly 19 (FIG. 4) the lip sealing portions 41a, 42a of the metal seat ring 23 and the sealing portion 24a of the resilient seal member 24 contact the sealing surface 18 of the disc 17. Moving the disc 17 into the fully closed position (FIG. 5) causes the sealing portion 24a of the resilient seal member to flatten out and provide a relatively wide band of contact between it and the sealing surface 18 of the disc. The disc provides radially outward pressure on the seal member 24, thereby causing a radially outward portion 24b of the seal member to press against a bottom portion 37a (FIG. 5) of the annular groove in the seat ring 23, thus biasing the seal member 24 tightly against the bottom portion of the groove.

When pressurized fluid in the right portion of the fluid flow passage 13 (as viewed in FIGS. 2–6) causes the upstream lip 42 (FIG. 5) to bend slightly to the left (downstream) and radially outward from disc 17, fluid is forced between the lip 42 and the disc seal surface 18. The pressurized fluid then pushes the resilient seal member 24 downstream against the lip 41, which in turn forces the downstream lip into an increased sealing engagement with the disc 17 forming a metal-to-metal secondary seal and preventing cold flowing of the primary resilient seal member 24. When the valve is exposed to abnormally high temperatures, as in the case of a fire in or around the valve 11, damage to the resilient seal member 24 occurs and the downstream metallic lip 41 becomes the primary seal as shown in FIG. 6.

Pressurized fluid in the left end of the fluid flow passage 13 causes the lip 41 (FIG. 5) to bend slightly to the right (downstream) and radially outward from the disc 17, forcing fluid between the lip 41 and the disc seal surface 18. The pressurized fluid then pushes the resilient seal member 24 downstream against the lip 42, which forces the downstream lip 42 into an increasing sealing engagement with the disc 17 to form a metal-to-metal secondary seal. When the valve is exposed to abnormally high temperatures, as in the case of fire in or around the valve 11, damage to the resilient seal member 24 occurs and the downstream metallic lip 42 becomes the primary seal as shown in FIG. 6.

The disc 17 is mounted in the fluid flow passage 13 (FIGS. 1, 2) by a shaft 46 extending vertically through a bore 47 in the disc. The shaft 46 is secured to the disc 17 by a pair of tapered pins 48 mounted in a pair of transverse bores 52 in the disc with a flat side 48a of each pin pressed firmly against a flat portion 53a, 54a of a corresponding one of a pair of transverse grooves 53, 54 formed in the shaft 46. The space between the upper portion of the shaft 46 and the valve 12 is sealed by a plurality of packed rings 58 (FIG. 2) pressed against a header ring 59 supported on a shoulder 60. The packing rings 58 are squeezed between the header ring 59 and a gland ring 64 to force the rings 58 tightly against the shaft 46 and the valve body 12. A plurality of capscrews 65, extending through a plurality of holes 66 (FIG. 1) in a cover plate 70 and threaded into a plurality of bores 71 in the valve body 12, secure the cover plate 70 to the upper portion of the valve body 12. Tightening of the capscrews 65 causes the cover plate 70 to press the gland ring 64 against the packing rings 58. The space between the lower portion of the shaft 46 and the valve body is similarly sealed by a plurality of packing rings 58a pressed against a header ring 59a by a gland ring 64a, capscrews 65a, and a cover plate 70a.

The upper and lower portions of the shaft 46 (FIG. 2) are supported in the valve body 12 by upper and lower sleeve-type bearings 74, 75, respectively, which bearings can be constructed of a non-galling material with a low coefficient of friction and capable of withstanding exposure to high temperatures. A pair of spacer rings 76, 76a, each mounted between the disc 17 and a corresponding one of the sleeve bearings 74, 75, center the disc 17 in the fluid flow passage 13 by resting against the sleeve bearings 74, 75.

The upper portion of the shaft 46 includes a transverse hole 80 for connecting the shaft 46 to a valve actuator (not shown), which actuator can be secured to the upper end of the valve body by capscrews (not shown) or bolts which fit into a plurality of threaded bores 81 (FIG. 1) in the valve body. An upper portion 12a and a lower portion 12b of the valve body each includes a pair of holes 82 for mounting a plurality of bolts (not shown) for centering the valve body between a pair of standard pipe flanges (not shown).

The present invention provides both a metal-to-metal seal and a resilient sealing surface to insure an extremely low rate of fluid leakage when the valve is operated at moderate temperatures. In case a fire should destroy the resilient sealing material, the metal-to-metal seal provides a secondary sealing action to hold fluid leakage to a low rate. The present invention is especially useful in applications where flammable or other hazardous fluids are being handled.

Some advantages of a valve in accordance with the present invention are that it provides:

1. A seat assembly which is relatively simple to manufacture by swaging the metal seat ring to lock the resilient seal member in place in the groove in the seat ring;
2. A seat assembly which is resistant to blow out of the resilient seal member during high velocity fluid flow;
3. A seat assembly in which the resilient seal member is restricted from cold flowing when exposed to high differential pressures;
4. A single resilient seal ring which is capable of effective sealing irrespective of the direction of fluid flow;
5. A valve sealing mechanism which is effective over a wide range of temperatures; and 6. A valve sealing device having a reliable secondary seal which insures an effective seal despite fire destruction of a resilient primary seal.

Although the present invention has been described as embodied in a butterfly valve, it should be understood that the invention can be utilized in other types of valves, and therefore is not restricted in application to the foregoing constructions.

Although the best mode contemplated for carrying out the present invention has been herein shown and described, it is apparent that modifications and variations may be made without departing from what is regarded to be the subject matter of the invention.

What is claimed is:

1. A fire-safe seat assembly for a rotary valve having an annular valve body defining a flow passage and a movable valve element supported in the flow passage for controlling flow, comprising:
   an annular one-piece metallic seat ring including a radially outer rigid body portion merging into radially inwardly extending arcuately curved relatively thin lips defining therebetween an annular groove, each of said lips having a constant cross-section,
   an annular resilient seal member disposed between said lips and substantially filling said groove, to extend normally radially inwardly of said seat ring,
   said lips converging toward each other with a curved configuration to terminate at their radially innermost extremities thereby to retain said seal member in said groove, and,
   said lips having a spring-like character for respectively flexing at their said innermost extremities and positioned to be engaged by the valve element as said resilient seal member is deformed, thereby to enhance sealing engagement with the valve elements by spring pressure of said metal lips thereagainst on either side of said resilient seal member.

2. A fire-safe valve seat assembly as defined in claim 1 wherein said resilient seal member is composed of a non-metallic material.

3. A fire-safe valve comprising a generally annular valve body defining a flow passage,
   a fluid flow control element movably supported in the flow passage for controlling the flow of fluids through the valve,
   an annular one-piece metallic seat ring disposed in surrounding relation to said flow passage and adjacent said body,
   said seat ring including a radially outer rigid body portion merging into radially inwardly extending arcuately curved relatively thin lips defining therebetween an annular groove, each of said lips having a constant cross-section,
   an annular resilient seal member disposed between said lips and substantially filling said groove to extend normally radially inwardly of said seat ring,
   said lips converging toward each other with a curved configuration to terminate at their radially innermost extremities thereby to retain said seal member in said groove,
   said lips having a spring-like character for respectively flexing at their said innermost extremities and positioned to be engaged by said valve element as said resilient seal member is deformed, thereby to enhance sealing engagement with the valve element by spring pressure of said metal lips thereagainst on either side of said resilient seal member,
   an annular retainer ring secured to said valve body and positioned to clamp said seat ring thereagainst, and,
   gasket means cooperating with said retainer ring, seat ring, and body to provide a fluid tight relationship therebetween.

4. A fire-safe valve as defined in claim 3 wherein said flow control element includes a hardened scratch-resistant surface for cooperating with said springly lips to provide a sealing action in said flow passage.

5. A fire-safe valve as defined in claim 3 wherein said flexible lips have been swaged about a portion of said resilient seal member to retain said seal member in said groove between said flexible lips.

6. A fire-safe valve as defined in claim 3 wherein said annular metal seat is radially movable with respect to said body to center itself diametrically about a sealing surface on said flow control element when said flow control element closes said passage.

7. A fire-safe valve as defined in claim 5 wherein said metal seat is made from a work hardenable material to provide said lips with the spring action to press said lips against said flow control element when said flow control element closes said passage.

* * * * *